US012077312B2

(12) United States Patent
Milliere et al.

(10) Patent No.: US 12,077,312 B2
(45) Date of Patent: Sep. 3, 2024

(54) AIRCRAFT HAVING A DIHYDROGEN TRANSPORT PIPE AND AN EMBEDDING CHANNEL FOR SAID TRANSPORT PIPE

(71) Applicants: Airbus SAS, Blagnac (FR); Airbus Operations SAS, Toulouse (FR)

(72) Inventors: Jérôme Milliere, Toulouse (FR); Romain Joubert, Toulouse (FR); Lionel Teyssedre, Blagnac (FR); Alistair Forbes, Toulouse (FR)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 177 days.

(21) Appl. No.: 17/948,518

(22) Filed: Sep. 20, 2022

(65) Prior Publication Data
US 2023/0086167 A1    Mar. 23, 2023

(30) Foreign Application Priority Data
Sep. 22, 2021    (FR) ...................................... 2109990

(51) Int. Cl.
*B64D 37/32* (2006.01)
*A62C 3/08* (2006.01)
*A62C 35/68* (2006.01)
*B64D 37/30* (2006.01)

(52) U.S. Cl.
CPC ............... *B64D 37/32* (2013.01); *A62C 3/08* (2013.01); *A62C 35/68* (2013.01); *B64D 37/30* (2013.01)

(58) Field of Classification Search
CPC ......... B64D 37/30; B64D 37/32; B64D 37/34
See application file for complete search history.

(56) References Cited

U.S. PATENT DOCUMENTS 10,583,934 B2 * 3/2020 Hara .................... B64D 37/005
2013/0288160 A1    10/2013 Kurre et al.

FOREIGN PATENT DOCUMENTS

JP          2001338660 A      12/2001

OTHER PUBLICATIONS

French Search Report; priority document.

* cited by examiner

*Primary Examiner* — Nicholas McFall
(74) *Attorney, Agent, or Firm* — Greer, Burns & Crain, Ltd.

(57) ABSTRACT

An aircraft having at least one transport pipe in which dihydrogen flows and, for each transport pipe, an embedding channel in which the transport pipe is housed. The embedding channel has a gutter that has a bottom and an opening opposite the bottom and a cover that covers the opening of the gutter. The cover constitutes an outer wall of the aircraft in direct contact with external air surrounding the aircraft. The cover has ventilation windows passing through it that allow the passage of the dihydrogen towards the outside. With such an arrangement, even in the event of dihydrogen leaking into the embedding channel, the dihydrogen is automatically evacuated towards the outside of the aircraft.

8 Claims, 3 Drawing Sheets

AIRCRAFT HAVING A DIHYDROGEN TRANSPORT PIPE AND AN EMBEDDING CHANNEL FOR SAID TRANSPORT PIPE

CROSS-REFERENCES TO RELATED APPLICATIONS

This application claims the benefit of the French patent application No. 2109990 filed on Sep. 22, 2021, the entire disclosures of which are incorporated herein by way of reference.

FIELD OF THE INVENTION

The present invention relates to the field of aircraft and, in particular, aircraft of which the energy source is liquid or gaseous dihydrogen, whether this is for supplying a fuel cell or for directly supplying the combustion chamber of an engine. The present invention thus relates to an aircraft having a dihydrogen transport pipe and an embedding channel that allows the passage of the transport pipe.

BACKGROUND OF THE INVENTION

It is known to use dihydrogen as energy source in an aircraft. The dihydrogen is stored in a reservoir and a transport pipe transports the dihydrogen from the reservoir towards the consuming device, such as, for example, a fuel cell or the combustion chamber of an engine.

In the event of dihydrogen leaking along this transport pipe, and so as to avoid the creation of a flammable mixture around the leak zone, it is necessary to provide dedicated devices.

It is thus possible to eliminate the presence of the oxidant (the oxygen contained in ambient air) necessary for ignition and to replace it with an inert gas.

It is also possible to ventilate the leak zone in order to limit the proportion of dihydrogen in the mixture and thus remain below the flammability threshold.

When the transport pipe is long, putting such devices in place leads to substantial penalties in the aircraft in terms of mass, cost, energy consumption and physical integration constraints, and makes it necessary to provide systems for monitoring, in real time, the correct operation of each of the devices.

SUMMARY OF THE INVENTION

An object of the present invention is to propose an aircraft having a dihydrogen transport pipe and an embedding channel that allows the passage of the transport pipe, while at the same time ensuring evacuation of the dihydrogen in the event of a leak by using passive ventilation during the flight phases.

To that end, an aircraft is proposed, having at least one transport pipe in which dihydrogen flows and, for each transport pipe, an embedding channel in which the transport pipe is housed, wherein the embedding channel has a gutter that has a bottom and an opening opposite the bottom and a cover that covers the opening of the gutter, wherein the cover constitutes an outer wall of the aircraft in direct contact with external air surrounding the aircraft and wherein the cover has ventilation windows passing through it that allow the passage of the dihydrogen towards the outside.

With such an arrangement, even in the event of dihydrogen leaking into the embedding channel, the dihydrogen is automatically evacuated towards the outside.

Advantageously, each ventilation window is closed by a stopper made from a breathable material that is impermeable to external water and permeable to dihydrogen present in the embedding channel.

Advantageously, the or each gutter has at least one low point at the bottom, the aircraft has, for each low point, an evacuation pipe of which a first end is fluidically connected to the gutter at the low point and of which a second end opens towards the outside of the aircraft and the evacuation pipe has a descending slope between the first end and the second end.

Advantageously, the aircraft has a ventilation system that is arranged to heat external air and to send this air thus heated into each embedding channel.

Advantageously, the ventilation system has an air inlet that is open towards the front of the aircraft, an aeration channel fluidically connected between the inlet and each embedding channel, and at least one heating means housed in the aeration channel.

Advantageously, the aeration channel has a port-side sub-channel extending on a first side of the aeration channel and supplying first embedding channels and a starboard-side sub-channel extending on a second side of the aeration channel and supplying second embedding channels, there is an auxiliary heating means in each sub-channel, the air inlet has a central aperture equipped with a fan, a port-side lateral aperture associated with the port-side sub-channel and a starboard-side lateral aperture associated with the starboard-side sub-channel, a selection system that is arranged to ensure, on the one hand, that the port-side sub-channel and the first embedding channels are supplied alternately via the port-side lateral aperture or via the central aperture and, on the other hand, that the starboard-side sub-channel and the second embedding channels are supplied alternately via the starboard-side lateral aperture or via the central aperture.

Advantageously, the selection system has a port-side door and a starboard-side door, and each door is able to move between a first position in which the door shuts off the part of the central aperture that supplies the side that the door is on and does not shut off the lateral aperture corresponding to the side that the door is on and a second position in which the door shuts off the lateral aperture corresponding to the side that the door is on and does not shut off the part of the central aperture that supplies the side that the door is on.

Advantageously, the gutter has an intermediate floor that separates the gutter into an upper gutter in which the transport pipe is fastened and a lower gutter in which the hot air coming from the ventilation system circulates, and the intermediate floor has holes passing through it.

BRIEF DESCRIPTION OF THE DRAWINGS

The abovementioned features of the invention, along with others, will become more clearly apparent upon reading the following description of one exemplary embodiment, the description being given with reference to the appended drawings, in which.

DETAILED DESCRIPTION OF THE PREFERRED EMBODIMENTS

Figure 1:
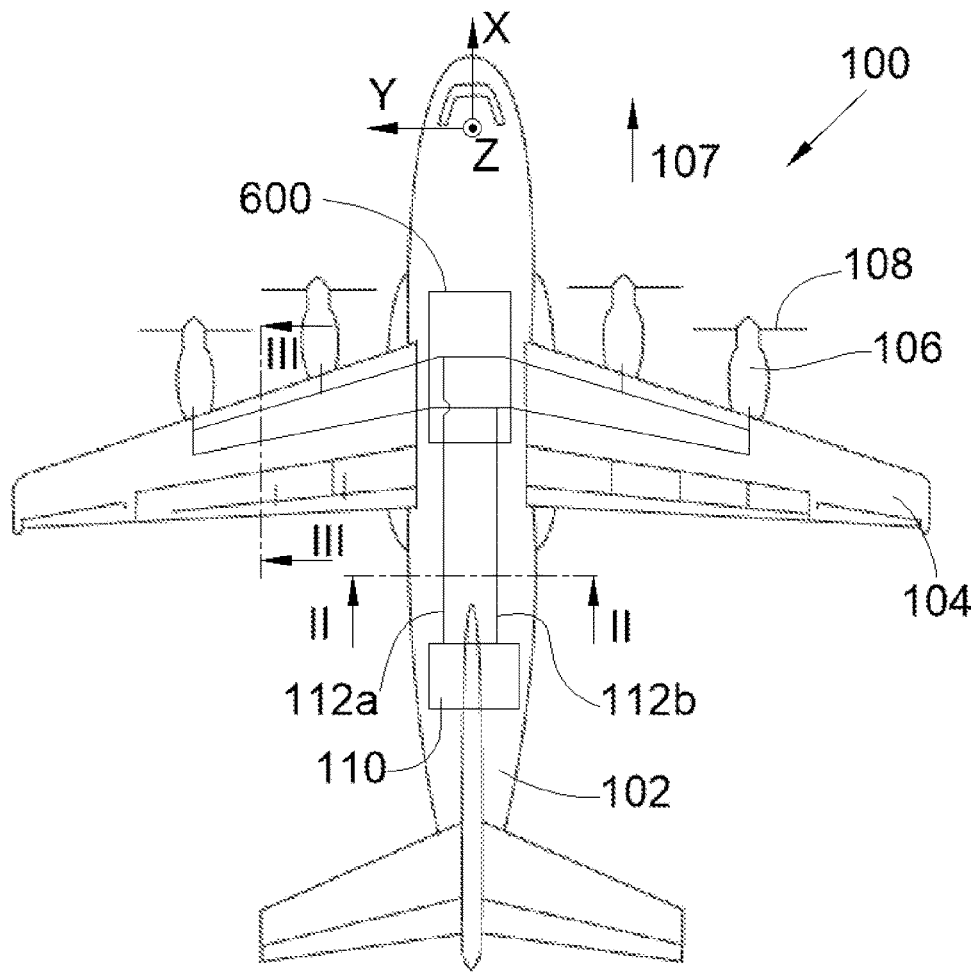
FIG. 1 is a view from above of an aircraft according to the invention.

FIG. 1 shows an aircraft 100 that has a fuselage 102, on either side of which is fastened a wing 104. Beneath each wing 104 is fastened at least one propulsion system 106.

By convention, the X direction is the longitudinal direction of the aircraft 100, the Y direction is the transverse direction of the aircraft 100, which is horizontal when the aircraft is on the ground, and the Z direction is the vertical direction or vertical height when the aircraft is on the ground, these three directions X, Y and Z being mutually orthogonal.

Moreover, the terms "front" and "rear" are to be considered relative to a direction of forward movement of the aircraft 100 when the propulsion systems 106 are in operation, this direction being schematically shown by the arrow 107.

In the embodiment of the invention that is presented here, each propulsion system 106 comprises an electric motor, a propeller 108 mounted on the driveshaft of the electric motor and a fuel cell that supplies the motor with electricity.

The fuel cell is supplied with oxygen and dihydrogen in order to produce electricity.

In another embodiment, the propulsion system 106 can take the form of a jet engine of which the fuel that is burnt in the combustion chamber is dihydrogen.

The aircraft 100 also has a dihydrogen reservoir 110 that, in this case, is disposed in a rear part of the fuselage, but that could be disposed in another part of the aircraft 100. The dihydrogen may be liquid or gaseous.

In order to transport the dihydrogen, the aircraft 100 has at least one transport pipe 112a-b in which the dihydrogen flows. For reasons of ease of implementation, the transport pipes 112a-b are preferentially disposed in the top part of the aircraft 100 and thus extend along the fuselage 102 and the wings 104 in the top part thereof.

In the embodiment of the invention that is presented in FIG. 1, there is a transport pipe 112a that extends between the reservoir 110 and a consuming device (the fuel cell, the jet engine) that consumes the dihydrogen and that transports the dihydrogen from the reservoir 110 towards the consuming device, and there is a transport pipe 112b that extends between the consuming device and the reservoir 110 and that transports the dihydrogen from the consuming device towards the reservoir 110, for example in the case in which the consuming device has not consumed all the dihydrogen provided. However, it is also possible to provide for the two transport channels to constitute two parallel supply lines that transport the dihydrogen to the motors.

Figure 2:
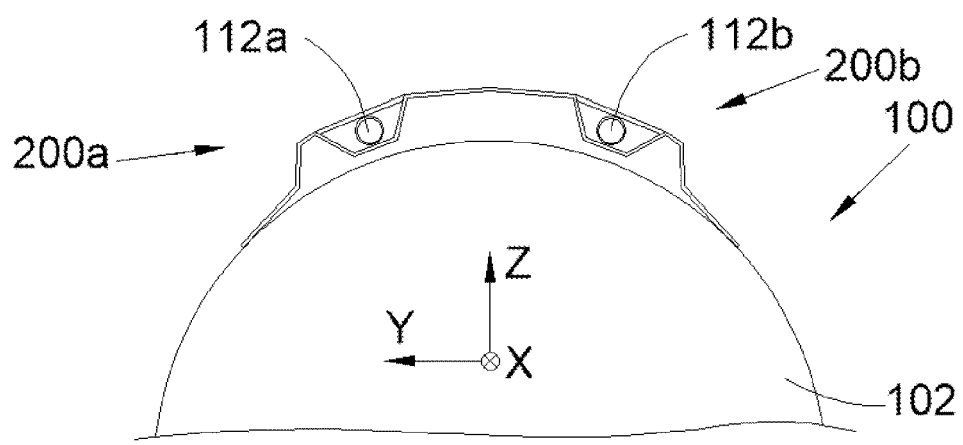
FIG. 2 is a view in cross section of the fuselage of the aircraft in FIG. 1 along the line II-II.
Figure 3:
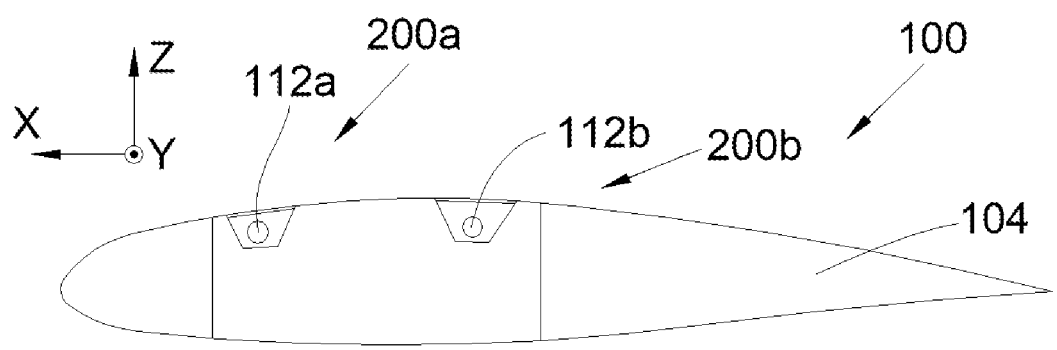
FIG. 3 is a view in cross section of a wing of the aircraft in FIG. 1 along the line III-III.

FIG. 2 shows a cross section of the fuselage 102 with the transport pipes 112a-b and FIG. 3 shows a cross section of a wing 104 with the transport pipes 112a-b.

In the embodiment shown in FIG. 2, the transport pipes 112a-b are housed in a module fastened to the outside of the skin of the fuselage 102, but they could be integrated directly in the fuselage 102 as is the case in FIG. 3 for the transport pipes 112a-b circulating along the wing 104 that are housed in this case in a box of the wing 104.

Figure 4:
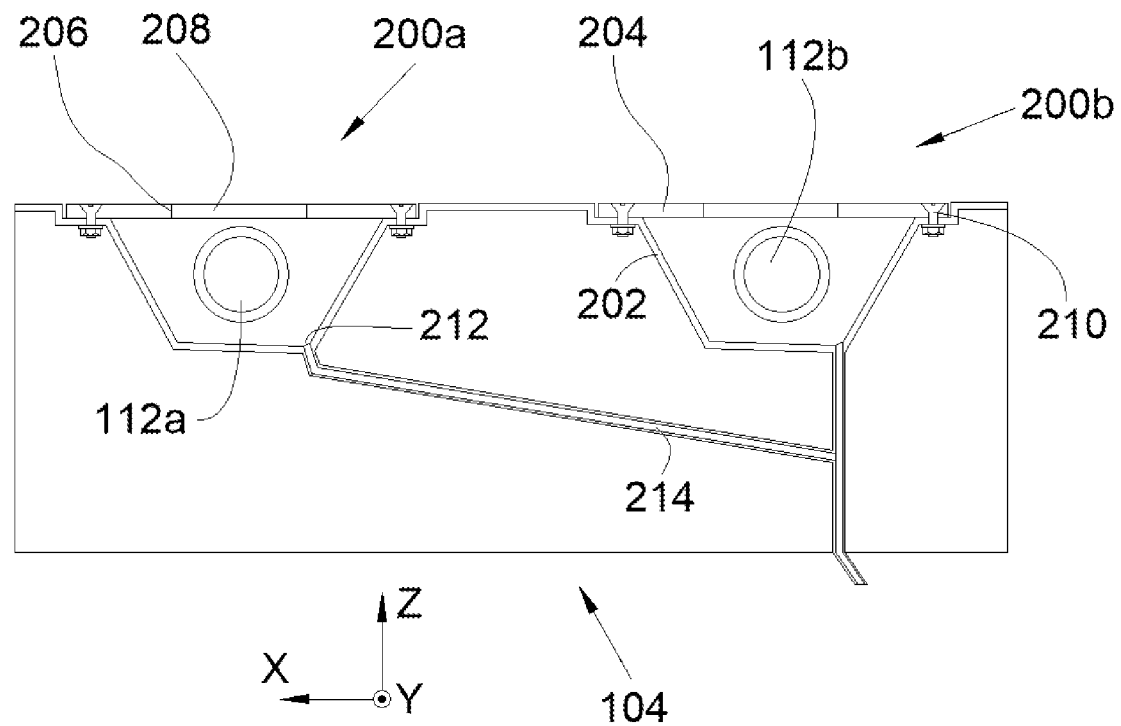
FIG. 4 is an enlarged view of the wing box in FIG. 3.
Figure 5:
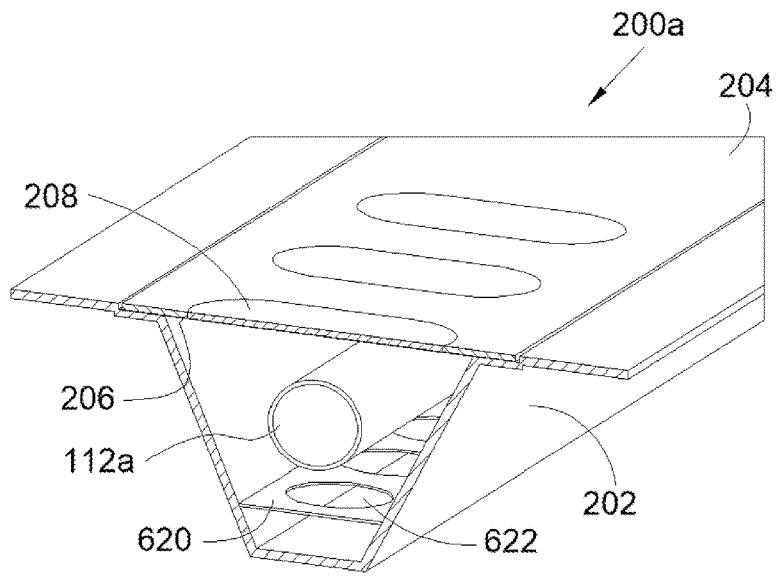
FIG. 5 is a perspective view of an embedding channel according to the invention.

FIG. 4 shows an enlarged view of FIG. 3, but the description that is given below and applies to the wing 104 can also be applied to the fuselage 102 and FIG. 5 shows a perspective view of a particular embodiment of the invention.

For each transport pipe 112a-b, the aircraft 100 has an embedding channel 200a-b in which the transport pipe 112a-b is housed.

The embedding channel 200a-b has a gutter 202 that has a bottom and an opening opposite the bottom, and a cover 204 that covers the opening of the gutter 202 by at least partially shutting it off. The transport pipe 112a-b is thus housed between the bottom and the cover 204. The transport pipe 112a-b is fastened to the gutter 202 by any appropriate means such as, for example, collars.

In the embodiment of the invention that is presented in FIGS. 2 to 5, the gutter 202 has a trapezoidal section, but sections with a different shape are possible.

The cover 204 constitutes an outer wall of the aircraft 100, i.e., it is in direct contact with external air surrounding the aircraft 100. The cover 204 is fastened to the outer wall of the aircraft 100 by any appropriate fastening means, such as, for example, in this case bolts 210.

The cover 204 has ventilation windows 206 passing through it that allow the passage of the dihydrogen, in particular in the event of a leak in the transport pipe 112a-b, towards the outside, which, in turn, limits the concentration of dihydrogen in the embedding channel 200a-b and the risks linked to the presence of dihydrogen. Preferentially, the cover 204 is in the upper position with respect to the bottom, i.e., above it.

With such an arrangement, even in the event of dihydrogen leaking into the embedding channel 200a-b, the dihydrogen is automatically evacuated towards the outside, this being done naturally as a result of the low density of the gaseous dihydrogen and the presence of the ventilation windows 206 in the upper part in the cover 204, without it being necessary to place fans and thus obtain a simple and lightweight installation. Thus, in the event of a fire due to the presence of dihydrogen, direct contact with the moving ambient air makes it possible to limit the extent of the fire by blowing out the flames. Furthermore, such an arrangement also makes it possible to confine the flames in the gutter 202 in the event of a fire breaking out, and thus to protect the nearby environment.

Furthermore, placing a single transport pipe 112a-b per embedding channel 200a-b prevents a fire that develops in an embedding channel 200a-b, as the result of a leak in the corresponding transport pipe 112a-b, from damaging the transport pipe 112a-b of the other embedding channel 200a-b.

In order to limit the impact of the ventilation windows 206 on the drag of the aircraft 100 in flight, each ventilation window 206 is closed by a stopper 208 made from a material that is breathable to dihydrogen, i.e., the stopper 208 is impermeable to external water that cannot enter the embedding channel 200a-b, and permeable, inter alia, to dihydrogen that is present in the embedding channel 200a-b and can be evacuated towards the outside. The stopper 208 is, for example, made from polypropylene or polyethylene.

In order to avoid, in the event of a fire, the fire remaining confined in the embedding channel 200a-b as a result of the presence of the stoppers 208, each stopper 208 is constituted of a material that is liable to break under the effect of heat, such as, for example, polypropylene or polyethylene. By breaking under the effect of heat, the stopper 208 constitutes a fusible component that makes it possible to open the ventilation window 206, if needed, so as to blow out the flames. In particular, the material for the stopper 208 is chosen so as to break when the temperature inside the gutter 202 reaches a value lower than the maximum acceptable temperature for the gutter 202 and the transport pipe 112a-b installed in the gutter 202, i.e., the temperature from which the integrity of the gutter 202 and of the transport pipe 112a-b is no longer guaranteed.

In the event of overpressure, it is also possible to provide that the cover 204 breaks under the effect of the overpressure thus limiting the risks of breakage of the gutter 202. To this end, the tear resistance of the cover 204 is lower than the tear resistance of the gutter 202, for example through the realization of thinner zones. It is also possible to provide that the breakage takes place at the fastening means of the cover 204, for example by using fusible bolts that break beyond a certain pressure.

In the event of a fire occurring in the gutter 202, and in order to limit the risks of the fire spreading towards the inside of the aircraft 100, the gutter 202 is made from a fire-resistant material and, more particularly, from a material capable of retaining its mechanical properties even in the event of a fire in the gutter 202. The material is, for example, titanium, a titanium alloy or a material that has a core that is not fire-resistant but is covered with a fire-resistant protective layer such as rock wool or ceramic.

The gutter 202 has at least one low point 212 at the bottom, and this makes it possible to drain the water that might have accumulated in the gutter 202 towards the one or more low points 212. The aircraft 100 then has, for each low point 212, an evacuation pipe 214 of which a first end is fluidically connected to the gutter 202 at the low point 212 and of which a second end opens towards the outside of the aircraft 100 and wherein the evacuation pipe 214 has a descending slope between the first end and the second end so as to evacuate, under the effect of gravity, the water thus collected.

On the ground, the evacuation pipe 214 makes it possible to evacuate the water and in flight, the difference in pressure between the first end and the second end allows additional natural aeration of the embedding channel 200a-b through the ventilation windows 206 and the stoppers 208 when they are present, which are then preferentially breathable.

In order to avoid the appearance of ice on the ventilation windows 206 and therefore the stoppers 208 when they are present, which could prevent the passage of the dihydrogen, the aircraft 100 has a ventilation system 600 that is disposed, in this case, at the upper part of the aircraft 100 at the junction of the wings 104 and that makes it possible to introduce external air, to heat this external air and to send this air thus heated into each embedding channel 200a-b.

Figure 6:
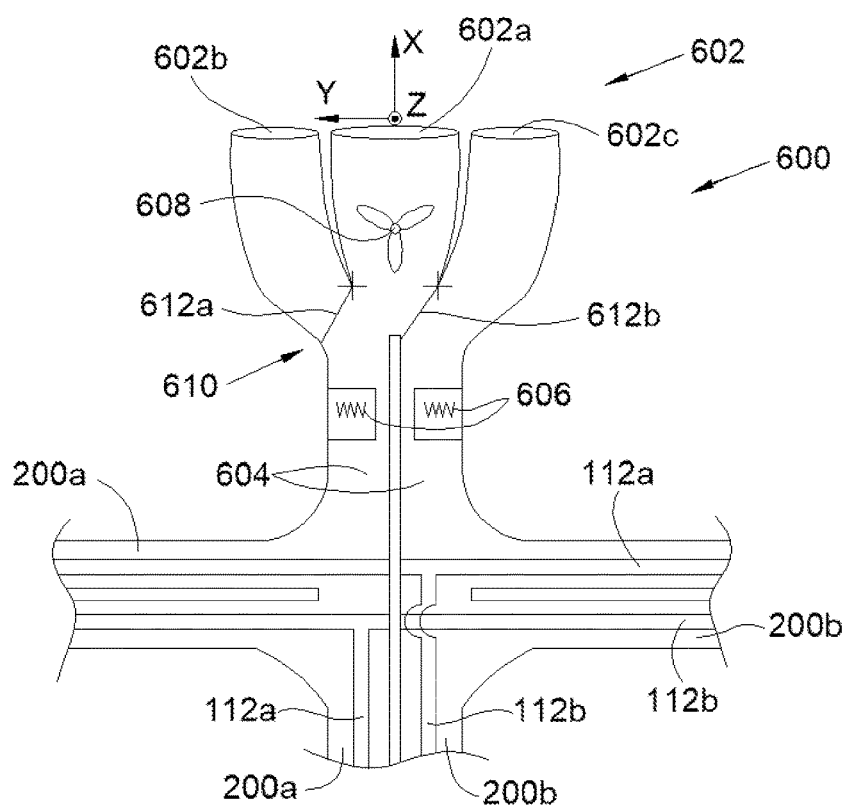
FIG. 6 is a view from above of a ventilation system implemented in the context of an embodiment of the invention.

In the embodiment of the invention that is presented in FIG. 6, the ventilation system 600 has heating means that are activated, in particular, in the event of cold conditions in order to prevent the creation of ice on the ventilation windows 206 and the stoppers 208 when they are present.

FIG. 6 shows a particular embodiment of the ventilation system 600.

The ventilation system 600 has an air inlet 602 that is open towards the front of the aircraft 100 in order to collect the external air when the aircraft 100 is moving forwards or is stopped.

The ventilation system 600 has an aeration channel 604 that is fluidically connected between the inlet 602 and each embedding channel 200a-b, which in this case are six in number, namely two for each wing 104 and two for the fuselage 102.

The air inlet 602 thus supplies the aeration channel 604 with external air and the aeration channel 604 distributes this air into each embedding channel 200a-b.

The aircraft 100 also has at least one heating means 606, such as, for example, a heating resistor, housed in the aeration channel 604. Thus, when the heating means 606 is heating up, the air that passes through the aeration channel 604 is heated and flows into each embedding channel 200a-b. Each embedding channel 200a-b is thus passed through by hot air, and this avoids the appearance of ice on the ventilation windows 206 or melts the ice when any is present.

The heating means 606 can be activated automatically as a function of the outside temperature or manually by a pilot of the aircraft 100.

In the embodiment of the invention that is presented here, the aeration channel 604 has a port-side sub-channel extending on a first side of the aeration channel 604 and supplying first embedding channels 200a that are on its side and a starboard-side sub-channel extending on a second side of the aeration channel 604 and supplying second embedding channels 200b that are on its side. In this embodiment, the heating means 606 is also double, with an auxiliary heating means in each sub-channel.

The air inlet 602 is divided into three apertures with a central aperture 602a and, for each sub-channel, a lateral aperture 602b-c (602b on the port side and 602c on the starboard side), i.e., a port-side lateral aperture 602b associated with the port-side sub-channel and a starboard-side lateral aperture 602c associated with the starboard-side sub-channel.

The central aperture 602a is equipped with a fan 608 that, when it is in operation, draws external air in through the central aperture 602a so as to propel it into each sub-channel. This operation is more particularly suitable when the aircraft 100 is on the ground.

The ventilation system 600 also has a selection system 610 that makes it possible to select which sub-channel is to be supplied via which aperture 602a-c.

The selection system 610 thus ensures, on the one hand, that the port-side sub-channel and the first embedding channels 200a on the port side are supplied alternately via the port-side lateral aperture 602b or via the central aperture 602a and, on the other hand, that the starboard-side sub-channel and the second embedding channels 200b on the starboard side are supplied alternately via the starboard-side lateral aperture 602c or via the central aperture 602a.

In this case, the selection system 610 has two doors 612a-b, namely a port-side door 612a and a starboard-side door 612b. Each door 612a-b is able to move between a first position in which the door 612a-b shuts off the part of the central aperture 602a that supplies the side that the door 612a-b is on and does not shut off the lateral aperture 602b-c corresponding to the side that the door 612a-b is on and a second position in which the door 612a-b shuts off the lateral aperture 602b-c corresponding to the side that the door 612a-b is on and does not shut off the part of the central aperture 602a that supplies the side that the door 612a-b is on.

In the embodiment of the invention that is presented in FIG. 6, the port-side door 612a is in the second position and the starboard-side door 612b is in the first position, but in normal operation the two doors 612a-b operate together, and are therefore either both in the first position or both in the second position.

When the two doors 612a-b are in the first position, the central aperture 602a is shut off and the lateral apertures 602b-c are not shut off and the air passes through these lateral apertures 602b-c. This operation is more particularly suitable when the aircraft 100 is in flight and when the external air enters into the lateral apertures 602b-c as a result of the forward movement of the aircraft 100.

When the two doors 612a-b are in the second position, the central aperture 602a is not shut off and the lateral apertures 602b-c are shut off and the air passes through the central aperture 602a. This operation is more particularly suitable when the aircraft 100 is on the ground and when the external air enters into the central aperture 602a as a result of the fan 608.

The movement of each door 612a-b from one position to the other is controlled, for example, by a pilot of the aircraft 100 and realized by an actuation means such as, for example, an electric motor.

In order to avoid the attachments that fasten the transport pipe 112a-b in the embedding channel 200a-b disturbing the flow of the potentially reheated air coming from the ventilation system 600, the gutter 202 has an intermediate floor 620 (FIG. 5). The intermediate floor 620 is at a distance from the bottom and separates the gutter 202 into an upper gutter in which the transport pipe 112a-b is fastened and a lower gutter in which the air coming from the ventilation system 600 circulates. The upper gutter extends between the intermediate floor 620 and the cover 204, the lower gutter extends between the bottom and the intermediate floor 620.

In order to allow the passage of the air from the lower gutter towards the upper gutter, the intermediate floor 620 has holes 622 passing through it that make it possible depending on their arrangement to ensure uniform ventilation of the upper gutter or to locate the heating at particular locations depending on the requirements.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
at least one transport pipe in which dihydrogen flows and, for each transport pipe,
an embedding channel in which said transport pipe is housed,
wherein the embedding channel has a gutter that has a bottom and an opening opposite the bottom and a cover that covers the opening of the gutter,
wherein the cover constitutes an outer wall of the aircraft in direct contact with external air surrounding the aircraft, and
wherein the cover has ventilation windows passing therethrough configured to allow passage of any dihydrogen present in said embedding channel towards an outside of the aircraft.

2. The aircraft according to claim 1, wherein each ventilation window is closed by a stopper made from a breathable material that is impermeable to external water and permeable to dihydrogen present in the embedding channel.

3. The aircraft according to claim 1,
wherein each gutter has at least one low point at the bottom,
wherein the aircraft has, for each low point, an evacuation pipe, of which a first end is fluidically connected to the gutter at the low point and of which a second end opens towards the outside of the aircraft, and
wherein the evacuation pipe has a descending slope between the first end and the second end.

4. The aircraft according to claim 1, wherein the aircraft has a ventilation system that is arranged to heat external air and to send this air thus heated into each embedding channel.

5. The aircraft according to claim 4, wherein the ventilation system comprises:
an air inlet that is open towards a front of the aircraft,
an aeration channel fluidically connected between the inlet and each embedding channel, and
at least one heating means housed in the aeration channel.

6. The aircraft according to claim 5,
wherein the aeration channel has a port-side sub-channel extending on a first side of the aeration channel and supplying first embedding channels and a starboard-side sub-channel extending on a second side of the aeration channel and supplying second embedding channels,
wherein there is an auxiliary heating means in each sub-channel,
wherein the air inlet has a central aperture equipped with a fan, a port-side lateral aperture associated with the port-side sub-channel and a starboard-side lateral aperture associated with the starboard-side sub-channel, a selection system that is arranged to ensure that the port-side sub-channel and the first embedding channels are supplied alternately via the port-side lateral aperture or via the central aperture and that the starboard-side sub-channel and the second embedding channels are supplied alternately via the starboard-side lateral aperture or via the central aperture.

7. The aircraft according to claim 6,
wherein the selection system has a port-side door and a starboard-side door, and
wherein each door is configured to move between
a first position in which the door shuts off a part of the central aperture that supplies the side that said door is on and does not shut off the lateral aperture corresponding to the side that said door is on, and
a second position in which the door shuts off the lateral aperture corresponding to the side that said door is on and does not shut off the part of the central aperture that supplies the side that said door is on.

8. The aircraft according to claim 4,
wherein the gutter has an intermediate floor that separates the gutter into an upper gutter in which the transport pipe is fastened and a lower gutter in which the heated air coming from the ventilation system circulates, and
wherein the intermediate floor has holes passing therethrough.

* * * * *